United States Patent [19]
Slater et al.

[11] Patent Number: 5,929,986
[45] Date of Patent: Jul. 27, 1999

[54] SYNCHRONOUS SPECTRAL LINE IMAGING METHODS AND APPARATUS

[75] Inventors: Joseph B. Slater, Ypsilanti; Michael J. Pelletier, Saline, both of Mich.

[73] Assignee: Kaiser Optical Systems, Inc., Ann Arbor, Mich.

[21] Appl. No.: 08/918,313

[22] Filed: Aug. 26, 1997

Related U.S. Application Data

[60] Provisional application No. 60/024,614, Aug. 26, 1996.

[51] Int. Cl.$^6$ ....................................................... G01J 3/28
[52] U.S. Cl. ............................................................. 356/326
[58] Field of Search ..................................... 356/328, 326, 356/308, 309, 301, 318, 317, 300

[56] References Cited

U.S. PATENT DOCUMENTS 5,173,748  12/1992  Bilhom .
5,329,352  7/1994  Jacobsen .

OTHER PUBLICATIONS

Huegel "Advanced . . . Improvements" SPIE vol. B24 Imaging Spectroscopy 11 1987 pp. 12–15.
H. Wong, Y. Yao, E. Schlig, *TDI Charge–Coupled Devices: Design and Applications;* IBM J. Res. Develop., vol. 36, No. 1, Jan. 1992, pp. 83–106.

*Primary Examiner*—K. P. Hantis
*Attorney, Agent, or Firm*—Gifford,Krass,Groh,Sprinkle, Anderson & Citkowski, PC

[57] ABSTRACT

Methods and apparatus for synchronous spectral line imaging are disclosed for use in conjunction with any of a number of radiative analysis techniques such as Raman or fluorescence detection. Light emitted points on a sample are separated into wavelength components and directed onto a two-dimensional image sensor such that the wavelength components impinge along one dimension of the sensor. The other dimension of the sensor is used in conjunction with spatial position relative to the sample, with at least certain of the steps being repeated for the different sample points so as to form the spectral line image. In terms of apparatus, the invention preferably utilizes at least one optical fiber having an input end to receive the light emitted by the sample and an output end to deliver the emitted light to the two-dimensional image sensor. The use of a flexible optical fiber facilitates the movement of the light received from the sample, movement of the received light relative to the sensor, or both. A wavelength-separating optical element such as a diffraction grating is disposed between the output end of the optical fiber and the sensor. The image may represent a straight line on the sample, or it may be curved, intermittent or discontinuous.

18 Claims, 2 Drawing Sheets

5,929,986

SYNCHRONOUS SPECTRAL LINE IMAGING METHODS AND APPARATUS

REFERENCE TO RELATED APPLICATION

This application claims priority of U.S. provisional application Ser. No. 60/024,614, filed Aug. 26, 1996, the entire contents of which are incorporated herein by reference.

FIELD OF THE INVENTION

This invention relates generally to spectral analysis such as Raman and fluorescence detection, and, in particular, to apparatus and methods for synchronously coordinating sample illumination and detection in a two-dimensional imaging apparatus.

BACKGROUND OF THE INVENTION

The simultaneous collection of Raman spectral information from many points along a line is called Raman line imaging, and the technique has proven useful in the analysis of compositional variation in a sample as a function of position. Raman mapping, which involves the sequential measurement of Raman spectra from many points on a line, is similar to Raman line imaging, but with important distinctions. First, data acquisition times are much longer. Second, many samples change with time, so the Raman data from all points on the line need to be acquired at the same time for meaningful conclusions to be drawn.

Raman line imaging has traditionally been done by illuminating a line on the sample with a laser, and imaging that line onto the entrance slit of a spectrograph. A two-dimensional detector attached to the spectrograph records spectra of each point along the entrance slit height. The number of Raman spectra in the Raman line image is determined by the point spread function of the instrument and the number of detector elements along the illuminated slit height image at the plane of the detector.

Three methods of sample illumination have been used for Raman line imaging. One method simply uses a 90° collection geometry with a transparent sample. This uses the laser photons very efficiently, but only works for transparent samples, and may be very sensitive to sample alignment and morphology. A second technique uses a cylindrical lens for line illumination. This method addresses the limitations of the first method, but the laser intensity along the line is not constant, due to the Gaussian profile of the laser beam. Raman line images collected with this illumination method must also be corrected for the non-uniform laser intensity along the line. A third illumination method overcomes laser intensity non-uniformity by rapidly scanning a laser spot to illuminate the line-shaped region.

All of the Raman line imaging approaches reported so far, however, rely on direct imaging of the illuminated sample region onto the entrance slit of the spectrograph. Fiber optic coupling of the sample emission to the spectrograph has, however, proven advantageous over direct coupling for many types of single-point measurements. The benefits of fiber optic coupling over direct coupling include ease of use, ruggedness, and operation in hostile environments.

SUMMARY OF THE INVENTION

The present invention resides in methods and apparatus associated with synchronous spectral line imaging in conjunction with any of a number of radiative analysis techniques, including Raman and fluorescence detection. In conjunction with the methods, light emitted from a point on a sample is separated into a line of wavelength components, and the wavelength components are directed along one dimension of a two-dimensional image sensor. The other dimension of the sensor is used in conjunction with spatial position relative to the sample, with at least certain of the steps being repeated for different points of the sample so as to form the spectral line image.

For example, the sample (or the point of light collection) may be moved to scan a plurality of points on the sample to form the line, and the line of wavelength components may be directed onto different columns of the sensor for each point. As an alternative to directing wavelength components associated with different points of the sample onto different columns, electrical charge generated at one column may be transferred to an adjacent column, thereby enabling a line of wavelength components associated with a different point to be received, then transferred, and so on, thus forming an image using time delay integration (TDI). As a further alternative, the invention may include the step of simultaneously receiving light from a plurality of points on the sample and directing the wavelength components from the plurality of points to respective multiple points of the sensor.

In terms of apparatus, the invention preferably utilizes at least one optical fiber having an input or distal end to receive the light emitted by the sample and an output or proximal end to deliver the emitted light to the two-dimensional image sensor. A wavelength-separating optical element such as a diffraction grating is disposed between the output end of the optical fiber and the sensor. The use of an optical fiber, being flexible, assists with movement relative to the sample, or the sensor, or both.

In one embodiment, for example, the apparatus may include first means for ensuring that light from a plurality of the points defining the line on the sample is directed to the input end of the optical fiber, and second means for directing the light from the output end of the optical fiber onto to the image sensor, with the first and second means being temporally coordinated so that as the input end of the optical fiber receives light from the points defining the line on the sample the wavelength components for different points are directed onto different columns of the sensor.

Various alternative modes of operation are thus made possible by the invention, in that the first and second means may be temporally coordinated but operate at different rates to allow for a build-up of the light directed onto at least one of the columns of the sensor. Alternatively, the number of points defining the line on the sample may be adjusted relative to the number of columns of the image sensor to achieve a magnification or reduction of the image. The apparatus may further incorporate a linear array of optical fibers, with the input ends of the fibers being geometrically oriented with respect to the points on the sample to be analyzed. The output ends of the fibers in this case are geometrically oriented with respect to a row of the two-dimension image sensor, such that multiple columns of the sensor receive the wavelength components associated with the plurality of sample points. Although the term "linear path" is used herein, the sample points need not form a straight line, but may be curved, intermittent, discontinuous, or represent discrete points.

DETAILED DESCRIPTION OF THE INVENTION

Figure 1:
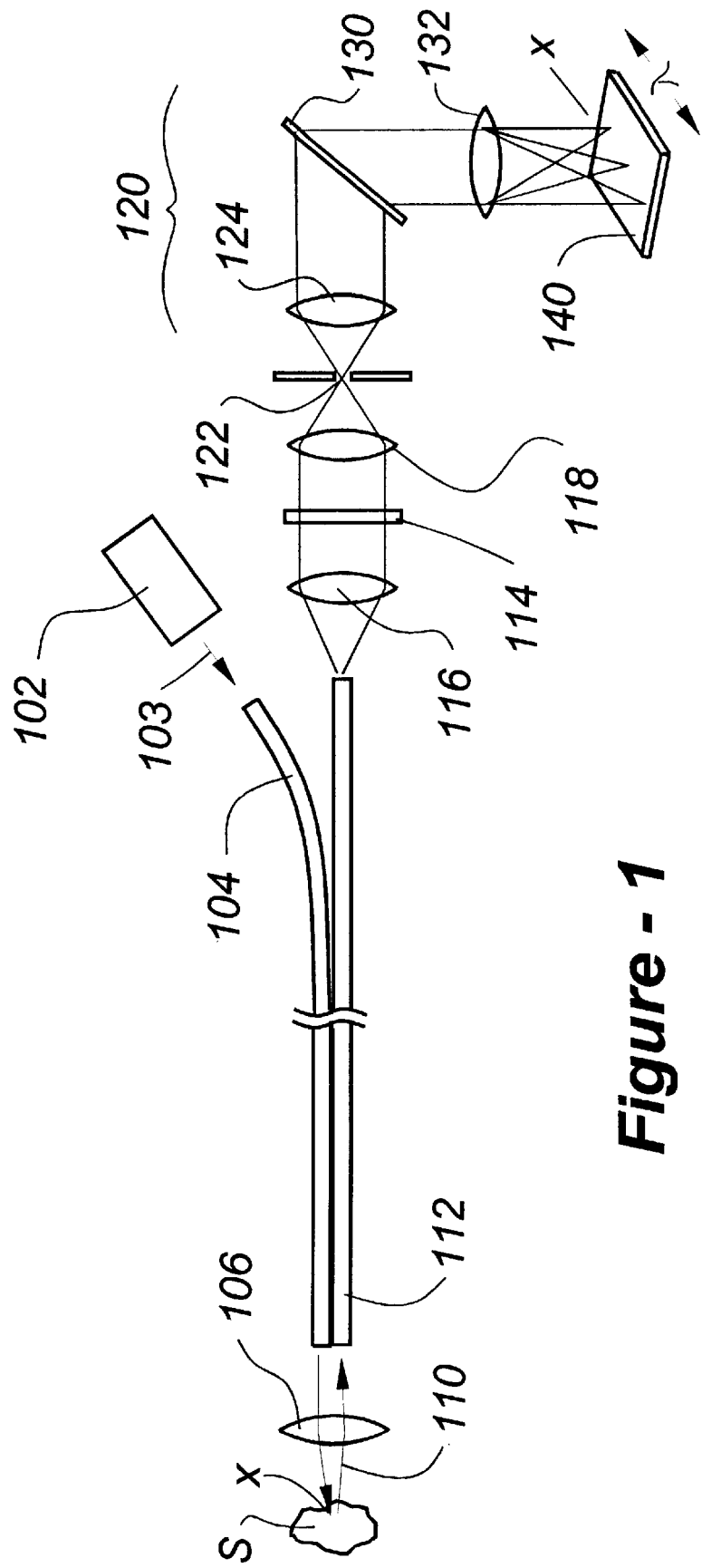
FIG. 1 illustrates certain optical components associated with a spectral line imaging system according to the invention.

Making reference to the figures, FIG. 1 illustrates certain optical components associated with the spectral analysis of a sample, S, disposed remotely from spectrometer apparatus, depicted generally at 120. The introduction of these components will allow embodiments of FIGS. 2–4 to be understood without the inclusion of many of the spectrometer components in particular, thereby enabling the reader to better concentrate on the various ways in which line images are obtained according to the invention.

In FIG. 1, a source of excitation energy such as a laser 102 injects a beam 103 into an excitation fiber 104, which carries the excitation energy of a nominal wavelength to a sample S, having been focused by an objective lens 106. The return or scattered spectra is delivered along path 110 into a collection fiber 112, preferably to a lens 116 which collimates the optical signal emerging from the collection fiber 112, enabling a notch filter 114 to more optimally remove Rayleigh wavelengths associated with the laser line.

Following Rayleigh rejection, a lens 118 may be used to focus the filtered, collected spectra onto a spectrometer slit 122. Given the small diameter of the optical fiber, the slit 122 is optional, however, and may be eliminated, depending upon the geometry of the optical path. A lens 124 may be used to collimate the beam, as required, for reception by a diffraction grating 130 which separates the beam into its component wavelength parts for analysis. A lens 132 is used to focus the wavelength-separated optical energy characteristic of the sample S onto a detector such as a charge-coupled device (CCD) 140.

Given the arrangement just described, the spectral signature of one point X of the sample S will be imaged onto the detector 140 at a point X along one dimension of the detector, with the spread of the scattered spectra λ being directed along the other dimension. Although a line of spectral information is gathered by the detector 140, this is not line imaging, but rather, the imaging of the point X, with the other portions of the detector 140 outside of the line of wavelengths being essentially unused.

The present invention resides in methods and apparatus for efficiently obtaining the Raman signature or other optical phenomena for a plurality of points which may form a straight or curved path across the sample. As will become evident below, this line may either be straight or curved, or even intermittent or discontinuous, depending upon the points of the sample to be investigated and the configuration of the apparatus involved.

Figure 2:
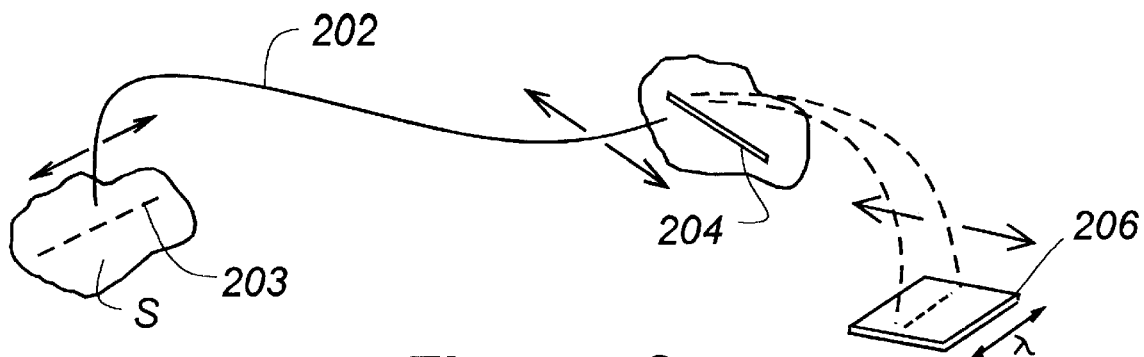
FIG. 2 illustrates an embodiment of the invention wherein the movements of the input and output of a collection fiber are coordinated to gather a line image.
Figure 3:
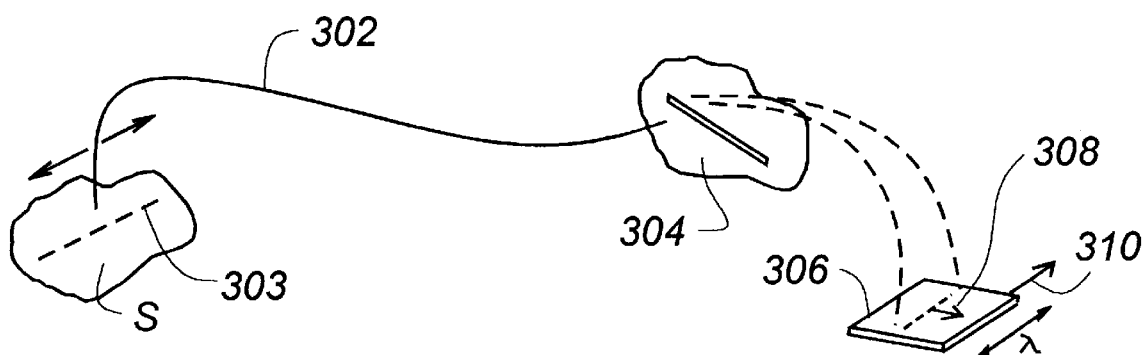
FIG. 3 illustrates an alternative embodiment of the invention wherein the output of a collection fiber remains stationary but time delayed integration is instead used to gather a line image.
Figure 4:
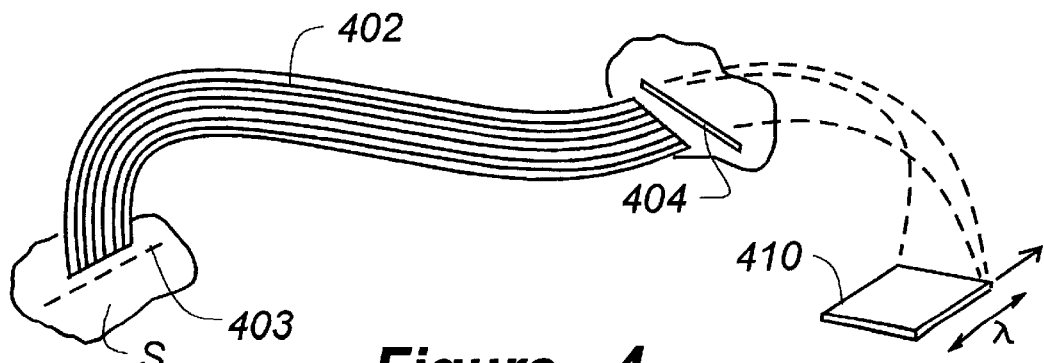
FIG. 4 represents a further alternative embodiment wherein the collection fiber in the probe head is replaced by a linear array of fibers.

The embodiments of FIGS. 2–4 illustrate particular ways in which line imaging may be carried out according to the invention. To clarify the following descriptions, as noted above, certain of the elements introduced with respect to FIG. 1 are not shown in FIGS. 2–4, with the understanding that at least some of these elements would be included in the preferred embodiments. For example, FIGS. 2–4 do not illustrate an excitation fiber or the way in which the sample is irradiated, nor do these figures show the way in which the collected light is wavelength-separated, with the understanding that both excitation and wavelength separation would be necessary in a complete system.

Other components not shown in FIGS. 2–4, however, which are optional, or at least may be implemented in a discretionary manner, include lens 116 and 118 and notch filter 114, which may be located closer to the sample S, or within the spectrometer proper. Indeed, at least the remote portion of the apparatus may assume one of a variety of "probehead" configurations such as those disclosed in commonly assigned U.S. Pat. No. 5,377,004, entitled REMOTE OPTICAL MEASUREMENT PROBE. Such designs typically include various components at the collection end of the instrument, such as gratings, filters and lenses, none of which are necessarily precluded by the present invention.

FIG. 2 represents an embodiment of the invention wherein a line image is obtained by simultaneously moving the sample with respect to the distal tip of a collection fiber 202 along a line 203 on a sample S while, at the same time, moving the proximal end of the collection fiber with respect to a slit 204 associated with the spectrometer. As the sample is moved relative to the probe head, a line 203 of illumination and collection is "painted" on the sample and, as the fiber at the spectrograph is moved synchronously along the slit, an image of the line 203 is transferred to the slit and onto the detector 206 such that now the detector 206 receives spatial information in one dimension corresponding to the line 203 and spectral information in the other dimension, thereby utilizing an area, if not the entire detector, as opposed to the single line on detector 140 in FIG. 1.

Although the embodiment just described and those which will be described with reference to FIG. 3 involve the use of a translational stage to move the sample relative to the probe head, it will be apparent to those of ordinary skill that other techniques may be used to paint a line of illumination on a stationary sample, including movement of the probe head relative to a stationary sample or the use of a rotating mirror or prism between the probe head and the sample to effectuate a scanning process. In addition, although detection and analysis functions are coordinated according to the invention, both spatial and temporal adjustments can be made to modify performance characteristics. For example, although the line images in FIGS. 2–4 are shown as being straight, they need not be, enabling a non-straight line to be imaged, along an interface or imperfection, for example. In addition, in terms of timing, several traces of the same line may be carried out to develop a time average of the sample points or to build up charge on the detector 206 before clocking information out of the detector for analysis. In addition, the ratio of the length of the line imaged on the sample relative to the line on the detector may be varied to realize a magnification or reduction function.

FIG. 3 represents apparatus and an associated method similar to those described with respect to FIG. 2, except that the fiber at the spectrograph is not moved. Instead, the detector 306 utilizes a time delay integration read out method whereby photo generated charge on the CCD is moved synchronously with the fiber optic probe head, as opposed to physically moving the proximal end of the fiber. That is to say, as the distal tip of the fiber 302 is moved along line 303 on the sample S, the line of charge associated with the light scattered by each point is clocked out synchronously with the movement of the fiber, as shown by arrow 308, after which the information is clocked out of line 310. Preferably, the wavelength-separated image on the detector 306 is positioned centrally with respect to the detector, enabling the information associated with each point along line 303 to be clocked out in either direction. Alternatively, however, the wavelength-separated image may be located elsewhere on the detector 306, such as along one of the edges of the detector device. Traditional time delayed integration can be used if a probe head does not retrace regions on the sample. However, if retracing is desired, the retrace data can either be read out of the CCD and added independently by the computer, or the direction of the TDI readout can be reversed, providing for bi-directional synchronization with a movement of the probe head relative to the sample.

FIG. 4 represents yet a further alternative embodiment according to the invention wherein anamorphic optics are used to illuminate the sample with a line image 403 rather than a circle image. In this case, the collection fiber in the probe head is replaced by a linear array of fibers 402 which are matched to the entrance slit 404 of the spectrometer. Excitation of the sample may occur along a second linear array of fibers (not shown), or a single fiber in the linear array 402 may be utilized for excitation purposes and spread with optics at the site of the sample to illuminate along the line 403. As a further alternative configuration, the source of illumination may be placed proximate to the sample, with optics or scanning process used to illuminate along the line 403.

That which is claimed is:

1. Synchronous spectral line imaging apparatus, comprising:
    a source of excitation radiation;
    means for illuminating a plurality of points on sample with the excitation radiation so as to induce the emission of light therefrom;
    a two-dimensional image sensor having a matrix of pixels arranged as rows and columns of pixel elements, the sensor being operative to output an electrical signal representative of the light received at each element;
    at least one optical fiber having an input end to receive the light emitted by the sample and an output end to deliver the emitted light to the two-dimensional image sensor;
    a wavelength-separating optical element disposed between the output end of the optical fiber and the two-dimensional image sensor, the element being operative to direct wavelength components of the light emitted by the sample onto the two-dimensional image sensor such that at least one column of the image sensor receives the wavelength components associated with one of the points of the sample illuminated with the excitation radiation; and
    means coordinated with the electrical signal output of the two-dimensional sensor for generating an image representative of the wavelength components associated with the plurality of sample points.

2. The apparatus of claim 1, wherein the means for generating an image representative of the wavelength components associated with a plurality of the points on the sample further includes:
    first means for directing the light emitted by the illuminated sample points to the input end of the optical fiber; and
    second means for directing the light from the output end of the optical fiber onto to the two-dimensional image sensor,
    wherein the first and second means are temporally coordinated so that the wavelength components for different points of the sample are directed onto different columns of the sensor.

3. The apparatus of claim 2, wherein the first and second means are temporally coordinated but operate at different rates to allow for a build-up of the light directed onto at least one of the columns of the sensor.

4. The apparatus of claim 2, wherein the number of points of the sample is adjusted relative to the number of columns of the image sensor to achieve a magnification or reduction of the resulting image.

5. The apparatus of claim 2, wherein the first means includes mechanical apparatus for moving the sample and the input end of the optical fiber relative to one another.

6. The apparatus of claim 2, wherein the second means includes mechanical apparatus for moving the output end of the optical fiber relative to the two-dimensional image sensor.

7. The apparatus of claim 1, wherein the means for generating an image representative of the wavelength components associated with a plurality of the points on the sample further includes:
    means for directing the light emitted by the illuminated sample points to the input end of the optical fiber; and
    electrical circuitry connected to the two-dimensional image sensor, the circuitry being operative to transfer the electrical signals generated by the column receiving the wavelength components associated with one of the of the points onto an adjacent column as the input end receives light from a different point of the sample from a different point of the sample.

8. The apparatus of claim 1, wherein the means for generating an image representative of the wavelength components associated with a plurality of the points of the sample further includes:
    a linear array of optical fibers the input ends of the fibers being geometrically oriented with respect to a path on the sample, and the output ends of the fibers being geometrically oriented with respect to a row of the two-dimension image sensor such that multiple columns of the sensor receive the wavelength components associated with the plurality of points defining the path.

9. The apparatus of claim 1, wherein the plurality of points form a straight line on the sample.

10. The apparatus of claim 1, wherein the plurality of points form a curved line on the sample.

11. The apparatus of claim 1, wherein the plurality of points form an intermittent path on the sample.

12. The apparatus of claim 7, wherein a dimension of charged transfer is defined as transverse to the columns of the image sensor, and wherein the circuitry is operative to transfer the electrical signals into adjacent columns in either direction along the dimension of charge transfer.

13. A method of synchronous spectral line imaging, comprising the steps of:
    a) directing excitation energy onto a sample to induce a radiative effect therefrom;
    b) receiving light emitted from a point on the sample;
    c) separating the light emitted by the point into a line of wavelength components representative of the radiative effect;
    d) directing the line of wavelength components onto a two-dimensional image sensor having rows and columns of pixel elements such that the wavelength components impinge upon one of the columns of the sensor;
    e) repeating steps b) to d) for a plurality of points forming a line on the sample; and
    f) using the result of e) to form a spectral line image of the sample.

14. The method of claim 12, wherein the step of repeating step b) includes the step of moving the sample to form the line on the sample.

15. The method of claim 12, wherein the step of repeating step b) includes the step of moving a collection optic receiving the wavelength components relative to a stationary sample.

16. The method of claim 12, wherein the step of repeating step d) includes the step of directing the line of wavelength components onto a different column of the sensor for each of a plurality of points on the sample.

17. The method of claim 13, wherein the step of using the result of c) to form a spectral line image of the sample includes the steps of:
   a) transferring electrical charge generated by the column upon which the wavelength components impinge to an adjacent column;
   b) receiving a new line of wavelength components associated with a different point of the sample; and
   c) repeating steps a) and b) in time synchronization with step e) of claim 13.

18. The method of claim 13, wherein the step of repeating step b) for a plurality of points forming a line on the sample includes the steps of:
   simultaneously receiving light from a plurality of points on the sample; and
   directing the wavelength components from the plurality of points to respective multiple columns of the two-dimensional image sensor.

* * * * *

UNITED STATES PATENT AND TRADEMARK OFFICE
CERTIFICATE OF CORRECTION

PATENT NO. : 5,929,986
DATED : July 27, 1999
INVENTOR(S) : Slater et al

It is certified that error appears in the above-identified patent and that said Letters Patent is hereby corrected as shown below:

Claim 7,
Line 12: Delete "from a different point of the sample".

Claim 14,
Line 1, "12" should be "13".

Claim 15,
Line 1, "12" should be "13".

Claim 16,
Line 1, "12" should be "13".

Column 6,
Line 23: Delete "of the".

Signed and Sealed this

Second Day of October, 2001

Attest:

NICHOLAS P. GODICI
*Attesting Officer*   *Acting Director of the United States Patent and Trademark Office*